United States Patent [19]

Thomas et al.

[11] 4,184,376

[45] Jan. 22, 1980

[54] PRESSURE SENSITIVE INDICATING DEVICE

[75] Inventors: Timothy J. Thomas; Harold A. Manguson, both of Minneapolis, Minn.

[73] Assignee: Donaldson Company, Inc., Minneapolis, Minn.

[21] Appl. No.: 969,256

[22] Filed: Dec. 13, 1978

[51] Int. Cl.² .............................................. G01L 7/06
[52] U.S. Cl. ...................................... 73/709; 73/729; 116/266; 116/DIG. 25
[58] Field of Search .................. 73/709, 38, 729, 716, 73/715; 116/268, 266, DIG. 7, DIG. 25, DIG. 42

[56] References Cited

U.S. PATENT DOCUMENTS

| | | | |
|---|---|---|---|
| 3,068,831 | 12/1962 | Witchell | 116/70 |
| 3,258,960 | 6/1963 | Baden et al. | 73/118 |
| 3,443,365 | 4/1966 | Lee et al. | 55/274 |
| 3,916,817 | 11/1975 | Kemp | 116/DIG. 25 |
| 3,939,457 | 2/1976 | Nelson | 73/38 |
| 4,020,783 | 5/1977 | Anderson | 116/DIG. 25 |
| 4,031,847 | 6/1977 | Sullivan | 116/65 |
| 4,033,733 | 7/1977 | Nelson | 55/274 |

FOREIGN PATENT DOCUMENTS

| | | | |
|---|---|---|---|
| 2617972 | 10/1977 | Fed. Rep. of Germany | 73/38 |
| 7601244 | 12/1977 | France | 73/38 |

*Primary Examiner*—Donald O. Woodiel
*Attorney, Agent, or Firm*—Merchant, Gould, Smith, Edell, Welter & Schmidt

[57] ABSTRACT

A device (10) for metering discrete lengths of filament utilized in a flexible filament vegetation cutting device is disclosed. The line metering device (10) is preferably used in flexible filament lawn mowers. An electric motor (28) rotatively drives a drive shaft (32) about its axis. A driving mechanism, preferably a spool (36) is coupled to the drive shaft (32) for rotation therewith whenever the drive shaft (32) is rotated. A driven mechanism, preferably a guide drum (84), is selectively coupled for rotation to the driving mechanism (36). The spool (36) has the flexible filament (66) wound about it and is coupled to one of the driven and driving mechanisms (84, 32) for rotation therewith. The metering mechanism includes a device (172) for rapidly decelerating the rotating drive shaft (32) and driving mechanism (36), together with a device (54) for disengaging the guide drum mechanism (84) from the spool (36) during the rapid deceleration whereby the guide drum (84) is free to rotate a discrete amount relative to the spool (36). In this manner a length of filament (66) is metered from the spool (36).

26 Claims, 14 Drawing Figures

PRESSURE SENSITIVE INDICATING DEVICE

TECHNICAL FIELD

The present invention relates to indicator devices which are responsive to fluid pressure. Such indicator devices can be responsive to negative or positive pressures, or to pressure differentials. More specifically, the present invention relates to a mechanical pressure indicator having a continuous locking capability. The indicator device of the present invention can be utilized as a restriction indicator for indicating a buildup of contaminants, dirt and the like, upon an air cleaner of an internal combustion engine.

BACKGROUND OF THE PRIOR ART

Numerous types of mechanical and electrical pressure indicators are known in the prior art. This is also true of pressure indicators, generally known as restriction indicators, which are used to indicate flow restriction within an air filter. Restriction indicators are particularly useful for indicating a buildup of contaminants within air filter media, particularly within air filter media utilized in an internal combustion engine.

One type of restriction indicator which is used with internal combustion engine air filters is a maximum restriction indicator. In a maximum restriction indicator, an indicator device becomes locked in a single maximum position. The locking position of the maximum restriction indicator is calibrated to indicate when the air filter media has been clogged with an undesirable amount of contaminants. Thus, prior to such an indicator reaching its maximum locked position, the amount of contamination of the air filter media cannot be readily determined from the restriction indicator. U.S. Pat. No. 3,068,831 to Witchell; U.S. Pat. No. 3,258,960 to Baden et al; and U.S. Pat. No. 3,443,365 each disclose maximum restriction indicators.

Another type of restriction indicator is a continuous readout or dial gauge type. This type of restriction indicator can either provide a reading only when a vacuum is applied or can have a continuous locking mechanism for locking an indicator at a plurality of points. The continuous locking feature has the advantage of permitting an operator to determine the condition of an air filter media without turning on the internal combustion engine. The continuous locking readout indicators of which the applicant's are aware, however, do not provide for releasing the locking mechanism from the same face of the indicator from which the indicator is read. Continuous readout type indicators are illustrated in U.S. Pat. Nos. 3,939,457 and 4,033,733 to Nelson and in West German Offenlegungsschrift 26 17 972.

SUMMARY OF THE INVENTION

The present invention is directed to a pressure sensitive indicating device. The device includes a housing defining a primary chamber. The primary chamber has a first end, a second end and an axis extending between the ends. A movable member is supported in the primary chamber for motion therein. The movable member has a first side disposed in said primary chamber and a second side disposed outside the primary chamber. A first aperture is formed in the housing for providing fluid communication between the primary chamber and the exterior of the housing. A biasing means biases the movable member toward the first end of the primary chamber. An indicator means is coupled to the movable member for movement therewith to indicate the position of the movable member within the primary chamber in response to fluid pressure applied to at least one of the sides of the movable member. The indicator means is visible from a viewing face of the housing and the viewing face is transverse to the primary chamber axis. A releasable locking means locks the movable member and the indicator means against the biasing force of the biasing means at a plurality of positions along the path of travel of the movable member toward the second end of the primary chamber. A release means is provided for releasing the locking means in order to allow the movable member to move toward the first end of the primary chamber under the biasing force of the biasing means. The release means extends generally transverse to the axis of the primary chamber and is actuatable from the viewing face of the housing.

In a preferred embodiment the primary chamber has a generally cylindrically shaped portion. The cylindrical portion of the primary chamber defines the first end, the second end and the axis of the primary chamber. The movable member is comprised of a hollow bellows-type diaphragm which has a first axial end secured to the housing adjacent the first end of the primary chamber's cylindrical portion and a second end received within the cylindrical portion for extending and retracting movements therein along said axis. The second axial end of the diaphragm is sealed to form a secondary chamber within the hollow interior of the diaphragm. A second aperture provides fluid communication between the secondary chamber and the exterior of the housing. A follower element is supported in the primary chamber's cylindrical portion and is coupled to the second axial end of the diaphragm for reciprocal motion therewith. The indicator means is coupled to the follower element for movement therewith to indicate the position of the follower element within the cylindrical portion of the primary chamber in response to fluid pressure applied to at least one of the apertures.

In a preferred embodiment, the indicator means includes an indicator needle which is pivotable about an axis generally transverse to the axis of the cylindrical portion. The indicator needle is disposed within an indicator portion of the primary chamber. The indicator portion of the primary chamber is an extension from one side of the cylindrical portion. The locking means includes a plurality of first ratchet teeth which extend from a portion of the follower element and one or more second ratchet teeth movably supported in the primary chamber. The second ratchet teeth are affixed in the axial direction of travel of the follower element and are movable into and out of engagement with the first ratchet teeth. The first and second ratchet teeth are arranged to permit motion of the follower element in a direction against the biasing force of the biasing means and to lock the follower element against motion in the direction with the biasing force of the biasing means. The release means includes a reset rod which extends generally transverse to the axis of the primary chamber and has a ramp section adjacent the second ratchet teeth. The reset rod is movable toward and away from the second ratchet teeth whereby the ramp section moves the second ratchet teeth out of engagement with the first ratchet teeth when the reset rod is actuated. In this manner, the biasing means is then free to move the follower element.

In another embodiment of the invention, the indicator needle is fixedly secured to a rotatable rod. The rotatable rod has a first end disposed outside the housing and a second end disposed within the primary chamber. A plurality of first ratchet teeth extend from a member which is fixedly attached to the second end of the rotatable rod. The first ratchet teeth and the rod are thus rotatable in unison. A plurality of mating second ratchet teeth are fixedly secured in position within the primary chamber. The first and second ratchet teeth mate with one another. The linear reciprocal movement of the follower member is converted into pivoting motion of the indicator needle and also into rotary motion of the rod and the first ratchet teeth. The first and second ratchet teeth in their engaged position allow the motion of the follower element against the bias of the first biasing means but not with the bias of the first biasing means.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiments of the invention.

DETAILED DESCRIPTION OF THE INVENTION

Figure 1:
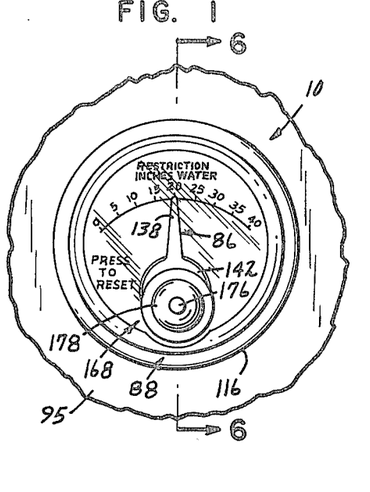
FIG. 1 is a front elevational view of an indicating device in accordance with the present invention.
Figure 2:
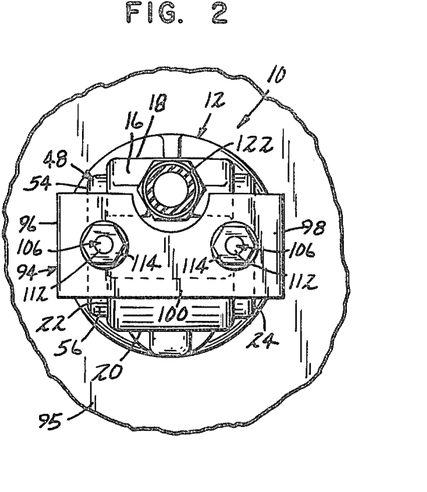
FIG. 2 is a rear elevational view of the device shown in FIG. 1.
Figure 6:
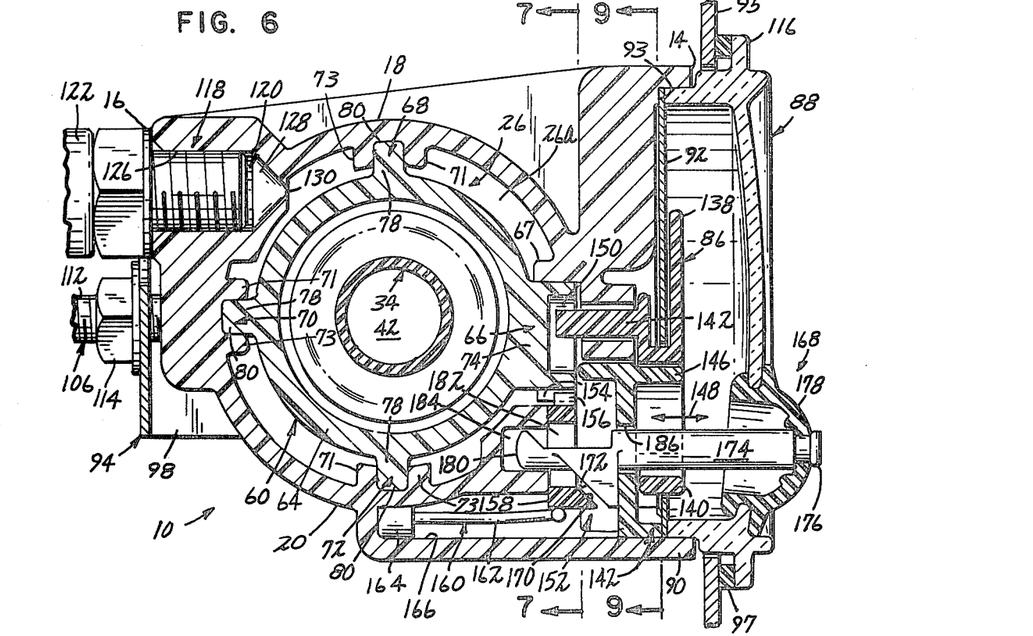
FIG. 6 is a sectional view taken along line 6—6 of FIG. 1.
Figure 8:
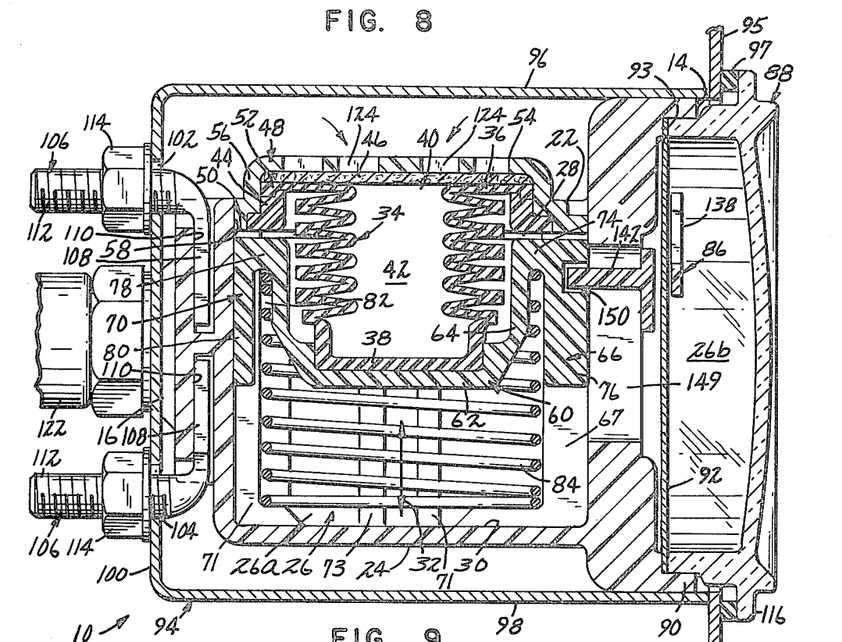
FIG. 8 is a sectional view taken along line 8—8 of FIG. 3.

Referring to the drawings in detail, wherein like numerals indicate like elements, there is shown in FIG. 1 a pressure sensitive indicating device designated generally as 10. The device 10 includes a housing 12 which has a front face 14, a back face 16, a top face 18, a bottom face 20, and a pair of opposing side faces 22, 24. As is best seen in FIGS. 6 and 8 a primary chamber 26 is formed within the housing 12. The primary chamber 26 is divided into a generally cylindrical portion 26a and an indicator portion 26b which extends from a side of the cylindrical portion 26a. The cylindrical portion 26a has a first end 28 adjacent the side face 22 and a second end 30 adjacent the side face 24. A longitudinal axis, shown as arrow 32, extends between the first and second ends 28, 30. The first and second ends 28, 30 can be considered ends of the primary chamber 26 and the axis 32 can be considered the axis of the primary chamber 26.

A diaphragm 34 is supported within the primary chamber 26. The diaphragm 34 serves as a movable member which is movable within the primary chamber in response to fluid pressure. The diaphragm 34 is a hollow bellows-type diaphragm which has a generally circular cross-section and a long travel. The diaphragm 34 is preferably made of a flexible elastomeric material. The diaphragm 34 has a first axial end 36 and a second axial end 38. The diaphragm 34 is generally coaxially aligned with the axis 32. The first axial end 36 of the diaphragm 34 has an opening 40 and the second axial end 38 is sealed. The second axial end 38 is sealed by forming the second axial end 38 as an integral closed end with the remainder of the diaphragm 34. A secondary chamber 42 is thus formed within the hollow interior of the diaphragm 34.

The diaphragm 34 is secured within the primary chamber 26 by attaching the first axial end 36 to the housing 12. The first axial end 36 is attached to the housing adjacent the first end 28 of the cylindrical portion 26a by means of a retainer ring 44, a filter element 46, and a cap 48. The retainer ring 44 contacts or is secured to a ledge 50 of the housing 12. A lip 52 of the first axial end 36 is received within an annular recess of the retainer ring 44. The filter element 46 is received on top of the first axial end 36 and covers the opening 40 to the secondary chamber 42. The cap 48 has a top section 54 and a generally cylindrical section 56. The top section 54 is received on top of a major surface of the filter element 46 and the cylindrical section 56 surrounds the outer circumference of the filter element 46, the lip 52 and the retainer ring 44. The cylindrical section 56 of the cap 48 is secured to the ledge 50 and an inner wall 58 of the housing 12. In the preferred embodiment, the housing 12, the retainer ring 44 and the cap 48 are made of a plastic material. The cap 48 is secured to the housing by any suitable means, such as by glue.

A follower element 60 is received generally about the second axial end 38 of the diaphragm 34. The follower element is comprised of a generally cup-shaped member which has a generally circular base 62 and a generally cylindrical portion 64. A first arm 66 and a plurality of additional arms 68, 70, and 72 extend radially outward from the cylindrical portion 64. The first arm 66 has a first section 74 which extends radially outward from the cylindrical portion 64 in a direction generally perpendicular to the axis 32 and a second section 76 which extends from the first section 74 toward the second end 30 and generally parallel to the axis 32. The additional arms 68–72 similarly have first sections 78 and second sections 80. A gap 82 is formed between each second sections, 76, 80 and the cylindrical portion 64. The first arm 66 is slidably supported between a pair of ribs 67, 69 and each additional arm 68, 70 and 72 is slidably supported between a pair of ribs 71, 73. The ribs 67–73 are all formed integral with the housing 12.

A coil spring 84 is supported within the primary chamber 26 and comprises a biasing means for biasing the follower element 60 and the second axial end 38 of the diaphragm 34 toward the first end 28 of the cylindrical portion 26a. The spring 84 provides a calibrated biasing force which is calibrated to the range of pressures which will be read by the device 10. The range of pressures which can be read by the device 10 can thus be changed by changing the spring 84 to a spring calibrated to the new desired range. A first end of the spring 84 contacts an interior wall of the housing 12 adjacent the second end 30 of the cylindrical portion 26a. A second end of the coil spring 84 is received within the gaps 82 and contacts the follower element 60. In this manner, the coil spring 84 biases the follower element 60 and the second axial end 38 of the diaphragm 34 toward the first end 28.

An indicator means 86 is coupled to the first arm 66 of the follower element 60. As will be explained more fully hereinafter, the indicator means 86 provides an indication of the relative position of the follower element 60 within the primary chamber 26 in response to pressure applied to one or both of the chambers 26, 42. The indicator means 86 is carried within the indicator portion 26b of the primary chamber 26 and can be seen from the front face 14 of the housing. The front face 14 forms a viewing face for the indicator device 10. The front or viewing face 14 is disposed transverse to the axis 32. A transparent cover 88 is attached to the housing 12 along its front face 14. The cover 88 is preferably glued to a annular ridge 90 formed along the front face 14. The transparent cover 88 thus seals the primary chamber 24 along the front face 14. A plate 92 is disposed inward of the transparent cover 28 and contacts tabs 93 which are formed integral with the housing 12 adjacent its front face 14. The plate 92 has a scale or calibrated gradations marked on its outer face. The scale on the face 92 coincides with the calibrated biasing force of the spring 84. When the spring 84 is changed to provide a biasing force in a different range, the scale or plate 92 must be accordingly changed. The scale will indicate a positive or negative pressure or a pressure differential, dependent on the manner in which the indicator device 10 is used. The various modes of use of the device 10 will be explained more fully hereinafter.

A generally U-shaped mounting bracket 94 is provided for mounting the device 10. As seen in FIGS. 1-3 and 8, the device 10 is mounted within a hole through a wall 95. In the preferred embodiment, the wall 95 would be a portion of a dash of a vehicle driven by an internal combustion engine. The viewing face 14 of the device 10 can best be viewed from the interior of such a vehicle. The bracket 94 has a pair of arms 96, 98 that are connected by a base 100. A pair of holes 102, 104 are formed through the base 100. An angled clamping member 106 is received through each of the holes 102, 104. Each of the clamping members 106 has a first arm 108 which is received within a recess 110 formed in the housing 14 at its back face 16. A second arm 112 extends generally perpendicularly from the first arm 108 and passes through one of the holes 102, 104. A nut 114 is threaded on each of the second arms 112. To attach the device 10 to the wall 95, the housing 12 is passed through the hole in the wall 95 until an annular rim 116 of the transparent cover 88 contacts a resilient sealing ring 97 which is interposed along an outer surface of the wall 95. Thereafter, the mounting bracket 94 is placed about the housing 10 and the first arms 108 of the clamping members 106 are placed within the recesses 110. The nuts 114 are tightened down upon the second sections 112. In this manner, the clamping members 106 pull the housing 12 through the hole in the wall 95, that is, in the direction to the left in FIG. 8 so that the rim 116 compresses the sealing ring 97 against the outer face of the wall 95. The tightening of the nuts 114 also forces the legs 96, 98 into contact with the inner surface of the wall 95. The device 10 is thus mounted to the wall 95.

In the preferred embodiment, the indicator device 10 is used to sense a negative pressure applied to the primary chamber 26. To apply a negative pressure to the primary chamber 26, a first aperture means, designated generally as 118, provides fluid communication between the primary chamber 26 and the exterior of the housing 12. The aperture means 118 includes a bore or hole 120 through the housing 12 between its back face 16 and the primary chamber 26 and a connecting conduit 122 coupled to the bore 120. The conduit 122 connects the indicating device 10 with a source of negative pressure. The secondary chamber 42 is open to atmosphere through the opening 40, the filter element 46 and apertures 124 through the cap 48. When negative pressure is applied through the conduit 122, the follower 60 and the axial end 38 are free to move against the bias of the spring 84 since the chamber 42 is open to atmosphere. The negative pressure must, of course, be sufficient to overcome the bias of the spring 84. The bore 120 has a first section 126 with a relatively large diameter and a tapering section 128 with a diameter which tapers down to a small restricted orifice 130. The restricted orifice 130 is provided for dampening any sudden pressure changes within the conduit 122 so that large and sudden fluctuations of pressure are not applied to the primary chamber 26.

In a preferred embodiment, the source of negative pressure in the conduit 122 is from an airstream passing through an air filter of an internal combustion engine. As dirt collects upon the air filter, more force is required to draw the air through the filter and hence the airstream creates a greater negative pressure in the conduit 122. This greater negative pressure draws the follower element 60 against the bias of the spring 84 and is sensed by the indicating means 86 in a manner explained hereinafter.

Figures 3, 4, 5:
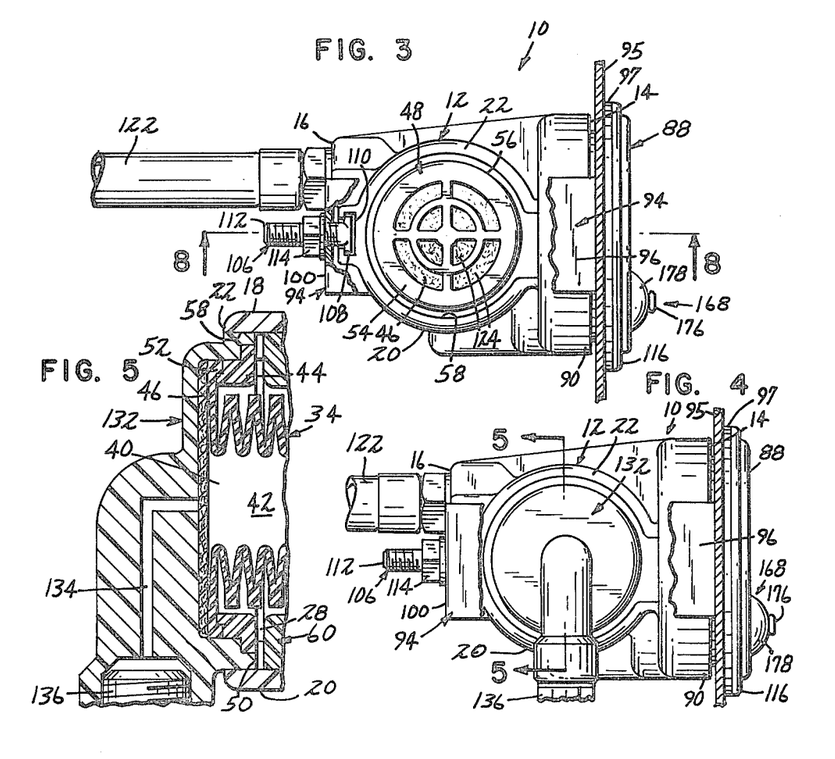
FIG. 3 is a side elevational view of the device shown in FIG. 1.
FIG. 4 is a side elevational view of a pressure sensitive indicating device having an alternate aperture mechanism.
FIG. 5 is a sectional view taken along line 5—5 of FIG. 4.

FIGS. 4 and 5 illustrate a way of adapting the device 10 to sense positive pressure applied to the secondary chamber 42 or to sense a pressure differential between the primary and secondary chambers 26, 42. To accomplish this, the cap 48 is replaced with a cap 132. Since all other parts of the device 10 are the same within FIGS. 4 and 5 the same numerals will be used to indicate the same elements of the device 10. The cap 132 has a restricted orifice or conduit 134 formed through it. The restricted orifice 134 communicates directly with the opening 40 into the secondary chamber 42. A connecting conduit 136 couples the restrictive orifice 134 to a source of positive pressure. Positive pressure applied through the connecting conduit 136 is used to move the second axial end 38 and the follower element 60 against the bias of the coil spring 84. The cap 132 also taps the indicator device for use as a pressure differential indicator. Alternatively, one source of fluid pressure can be coupled to the conduit 136 to be applied to the secondary chamber 42 and a second source of pressure can be coupled to the conduits 122 to be applied to the primary chamber 26. In this manner, the indicator means 86 would indicate a pressure differential between the pressures applied to the conduits 122 and 136.

Figure 9:
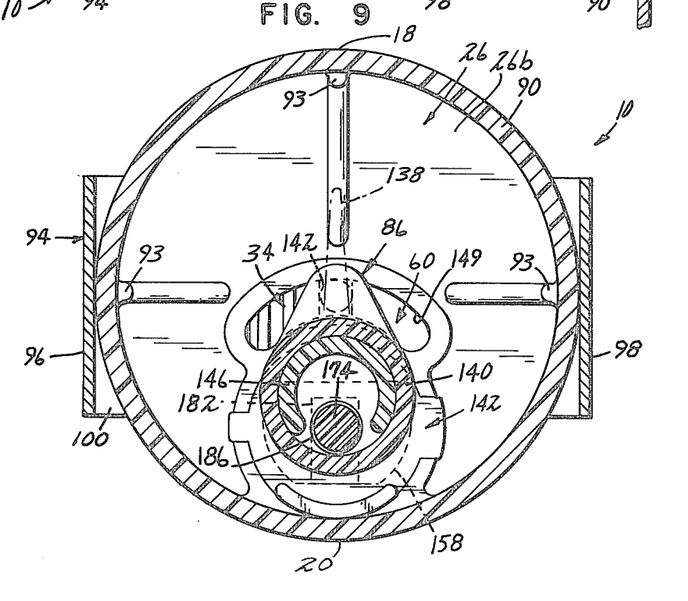
FIG. 9 is a sectional view taken along line 9—9 of FIG. 6.

The indicator means 86 includes an indicator needle 138 pivotable about an axis transverse to the axis 32 of the primary chamber portion 26a. A generally cylindrical mounting member 140 and a coupling pin 142 are formed integral with the indicator needle 138. A plug member 144 is attached within the primary chamber 26 adjacent the front face 14. The plug member 144 has a curved section 146 which is best seen in FIG. 9. The mounting member 140 of the indicator means 86 is received about the curved section 146. In this manner, the indicator needle 138, the mounting member 140 and the coupling pin 142 are pivotably supported about an axis shown as arrow 148 in FIG. 6.

The coupling pin 142 extends generally transverse to the axis 32 and radially inward toward the follower element 60. An arcuate slot 149 is formed in the housing 12 and slot 150 is formed in the second section 76 of the first arm 66. The coupling pin 142 passes through the slot 149 is received within the slot 150. In this manner, any linear reciprocal movement of the follower element 60 is converted into pivotal motion of the indicator needle 138 about the axis 148.

Figure 7:
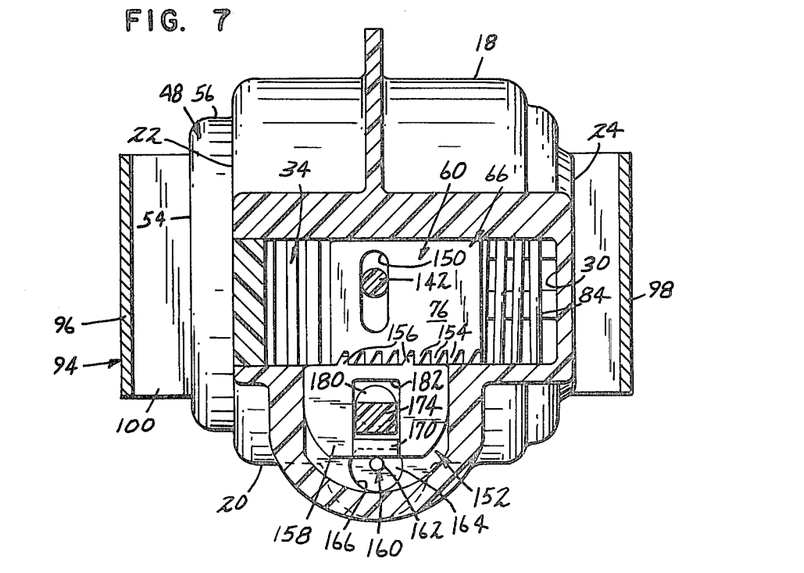
FIG. 7 is a sectional view taken along line 7—7 of FIG. 6.

A releasable locking means, indicated generally as 152 in FIG. 7, locks the follower at a plurality of positions in its travel from the first end 28 toward the second end 30 through the primary chamber 26. The indicator needle 138 is thus locked in a maximum position to which it has moved even after the pressure applied to one of the chambers 26, 42 has been removed. The locking means 152 is comprised of a plurality of first ratchet teeth 154 formed on the first arm 66 and a pair of mating second ratchet teeth 156 formed on a slide member 158. The slide member 158 is biased upwardly by a spring 160 into a position wherein the second ratchet teeth 156 engage the first ratchet teeth 154. The spring 160 is comprised of a flexible wire or rod 162 and a mounting block 164. The spring 160 is bent upwardly to provide an upward biasing force to the slide member 158. The mounting block 164 and the flexible wire 162 are received within a groove 166 in the housing 12. As seen in FIG. 7, a top surface of both the groove 166 and the mounting block 164 are flat in order to align the flexible wire 162 in the upwardly bent position shown in FIG. 6. With the slide member 158 biased upwardly, the first and second ratchet teeth 154, 156 permit the motion of the follower element 60 toward the second end 30 against the biasing force of the coil spring 84, that is, to the right in FIG. 7. However, the first and second ratchet teeth 154, 156 in their engaged position do not permit the follower element 60 to move toward the first end 28 under the biasing force of the coil spring 84. This is accomplished in the conventional manner by arranging the angled and perpendicular surfaces of the ratchet teeth 154, 156 in the direction shown in FIG. 7.

A release means, designated generally as 168 in FIG. 6, is provided for moving the second ratchet teeth 156 out of engagement with the first ratchet teeth 154 in order to permit the follower element 60 to be moved toward the first end 28 under the biasing force of the coil spring 84. The release means 168 is comprised of a first ramp section 170 on the slide member 158 and a mating second ramp section 172 on a reset rod 174. The reset rod 174 has a first end 176 which extends outward of the housing 12 and the transparent cover 88. A flexible cap or seal 178 is secured within a hole in the cover 88. The cap 178 has a hole through which the first end 176 of the rod 174 passes. The cap 178 performs a dual function. First of all the cap 178 forms an airtight seal between the primary chamber 26 and the outside atmostphere. The airtight seal is formed both between the hole through the cover 88 and the hole through which the rod 174 passes through the cap 178. Secondly, the cap 178 serves as a biasing member which biases the reset rod 174 to the right in FIG. 6 wherein the mating ramp sections 170, 172 are out of contact. An inner surface of the plug member 142 acts as a stop for preventing the motion of the rod 174 any further out of the housing 12. As seen in FIG. 6, a portion of the rod 174 adjacent the ramp section 172 contacts a portion of the plug member 142 in the outermost disposition of the rod 174. In this outermost disposition the ramp section 172 is held out of contact with the ramp section 170, yet in close proximity thereto.

The reset rod 174 has a second end 180. The second end 180 passes through a slot 182 in the slide member 158 and is received within a recess or groove 184 in the housing 12. The rod 174 also passes through a hole 186 in the plug member 144. As seen in FIG. 7, the rod 174 has a square cross-section at the ramp section 172 which mates with a rectangular cross-section of the slot 182 to hold the rod 174 in rotational alignment. The reset rod 174 is thus aligned transversely to the axis 32 of the primary chamber 28.

In order to disengage the second ratchet teeth 156 from the first ratchet teeth 154, the reset rod 174 is pushed inwardly against the bias of the cap 178. In this manner, the angled surface of the ramp section 172 contacts the angled surface of the ramp section 170 and cams or slides the slide member 158 downwardly against the bias of the flexible rod 162. The follower member 60 is thus free to move with the biasing force of the coil spring 84.

When the indicator device 10 is used to indicate contamination of an air filter in an internal combustion engine, the indicator needle 138 will be pivoted in a clockwise direction as seen in FIG. 1 as greater negative pressure is applied to the primary chamber 26. The indication of maximum negative pressure within the chamber 26 will remain indicated on the calibrated face plate 92 even when the internal combustion engine is shut off through the action of the releasable locking means 152. When a maximum amount of contamination has been indicated and the air filter has been replaced, the reset rod 174 is depressed in order to permit the needle 138 to be pivoted counterclockwise by the motion of the follower element 60 under the biasing force of the coil spring 84. The process of continual locking readout of negative pressure applied to the primary chamber 26 can again begin. In other applications, the continuous locking of the follower element 60 and the indicator needle 138 is used to indicate maximum pressure differentials or maximum positive pressure within the secondary chamber 42.

Another embodiment of the indicating device, designated generally as 10', is illustrated in FIGS. 10-14. Parts of the device 10' which are similar to the device 10 will be indicated in like primed numerals. In most part, the device 10' is similar to the device 10 except for a modified follower element, indicating means, releasable locking means and release means.

Figures 10, 12, 13:
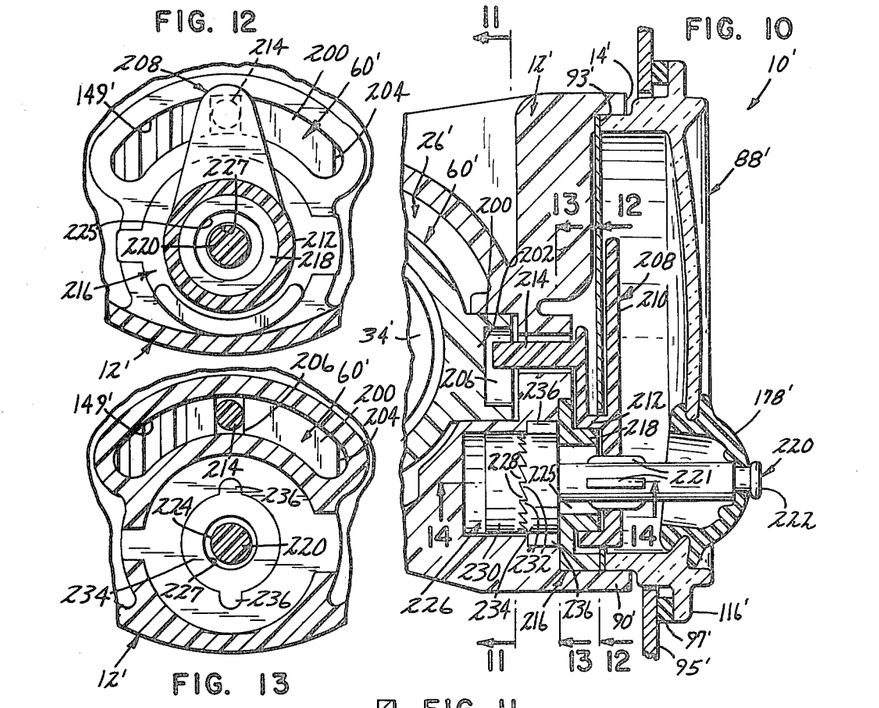
FIG. 10 is a sectional view similar to FIG. 6 of another embodiment of the present invention.
FIG. 12 is a sectional view taken along line 12—12 of FIG. 10.
FIG. 13 is a sectional view taken along line 13—13 of FIG. 10.

The follower element 60' has a first arm 200. The first arm 200 has a first section 202 extending generally radially and transversely from the axis of the primary chamber and a second section 204 extending generally parallel thereto. The second section 204 has a slot 206 formed in it but does not have ratchet teeth extending from it.

An indicator means 208 is comprised of an indicator needle 210, a cylindrical section 212 and a coupling pin 214 each formed integrally with one another. A plug member 216 is fixedly secured within the primary chamber 26' of the housing 12' adjacent the front face 14'. The plug member 216 has a curved section 218 about which the cylindrical section 212 of the indicator means 208 is rotatably received. A reset rod 220 extends from the interior of the primary chamber 26' of the housing 12' to a location exterior of the housing 12' and the transparent cover 88'. The indicator means 208 is fixedly secured to the reset rod 220 by splines 221 so that the indicator means 208 and the rod 220 are rotatable in unison. The coupling pin 214 passes through an arcuate slot 140' and is received in the slot 206. The linear motion of the follower element 60' is transfered as pivotal motion of the indicator needle 210 through the coupling pin 214. In the device 10' the needle 210 pivots about the axis of the rod 220.

The rest rod 220 has a first end 222 which extends outward of the cover 88' and is secured in an air-tight manner to the cap 178'. The rod 220 has a second end 224 which is supported within the primary chamber 26' of the housing 12'.

A releasable locking means, designated generally as 226, permits the movement of the follower element 60' against the bias of the coil spring 84' but locks the follower element 60' to prevent motion of the follower element 60' under the biasing force of the coil spring 84'. The locking means 226 includes a plurality of first ratchet teeth 228 which extend from a disc or member 230 and a plurality of mating second ratchet teeth 232 which extend from a second disc or member 234. The disc 234 has a pair of ears 236 which fit within mating recesses in the housing 12'. The disc 234 is thus secured against rotary motion relative to the housing 12'.

Figures 11, 14:
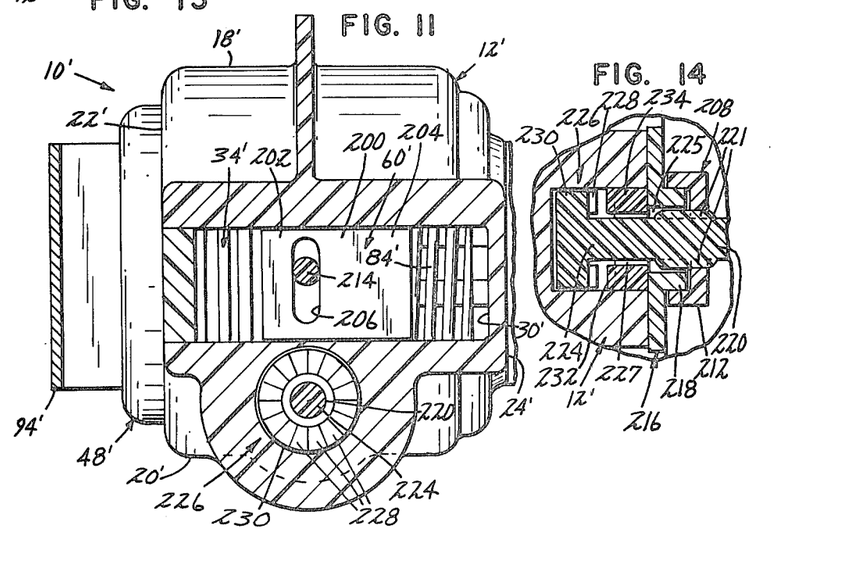
FIG. 11 is a sectional view taken along line 11—11 of FIG. 10.
FIG. 14 is a sectional view taken along line 14—14 of FIG. 10.

The rod 220 extends inwardly from the cover 88' and passes through a hole 225 in the plug member 216 and through a hole 227 in the disc 234. The disc 230 is fixedly secured to the second end 224 of the rod 220. The disc 230 is thus rotatable in unison with the rod 220. The cap 178' biases the disc 230 outward toward the front face 14. In this manner, the first ratchet teeth 228 are biased into engagement with the second ratchet teeth 232. The ratchet teeth 228, 232 are arranged to lock the follower element 60' in the manner described above. The rod 220 also acts as a release means. By depressing the rod 220 against the bias of cap 178', the first teeth 228 can be moved out of engagement with the second teeth 232. This disengaged condition is shown in FIG. 14. With the first and second ratchet teeth 228, 232 out of engagement, the follower element 60' is free to move under the biasing force of the coil spring 84'. The device 10' can be used in the same manner as the device 10 to measure positive or negative pressure or pressure differentials.

The indicator devices 10, 10' have numerous advantages. For example, the moving parts of the devices 10, 10' such as the follower element 60, 60', the indicator means 86, 208 and the locking means 152, 226 are on the sealed clean air side of the diaphragm 34, that is, within the primary chamber 26 and are thus sealed from outside contamination. The use of a long travel diaphragm 34 in conjunction with a calibrated spring 84 results in readout accuracy. Also, an infinite number of readout ranges can be obtained by simply changing the calibrated spring 84 and the scale on the plate 92. The use of restricted orifices 130, 134 at the pressure and vacuum inlets dampens the effects of a pulsating pressure or vacuum source. Also, the indicator devices 10, 10' can be easily modified to serve as pressure gauges, vacuum gauges or differential pressure gauges by the use of the cap 132 which can be secured to the housing 12 or 12' by a suitable means including a threaded adapter.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extend extended by the broad general meaning of the terms in which the appended claims are expressed.

We claim:

1. A pressure sensitive indicating device comprising:
    a housing defining a primary chamber having a generally cylindrical portion and an indicating portion extending therefrom, said cylindrical portion having a first end, a second end and an axis extending between said ends in a first direction;
    a hollow bellows-type diaphragm having a first axial end secured to said housing adjacent said first end and a second axial end received within said cylindrical portion for extending and retracting movements therein along said axis;
    means for sealing said second axial end of said diaphragm to form a secondary chamber within the hollow interior of said diaphragm;
    first aperture means for providing fluid communication between said primary chamber and the exterior of said housing;
    second aperture means for providing fluid communication between said secondary chamber and the exterior of said housing;
    a follower element supported in said cylindrical portion and coupled to said second axial end of said diaphragm for motion therewith;
    biasing means supported in said primary chamber for biasing said follower element and said second axial end toward the first end of said primary chamber's cylindrical portion;
    indicator means coupled to said follower element for movement therewith to indicate the position of said follower element within said primary chamber in response to fluid pressure applied to at least one of said aperture means, said indicator means being visible from a viewing face of said housing, said viewing face being transverse to the axis of the primary chamber's cylindrical portion;
    releasable locking means for locking said follower element and said indicator means against the biasing force of said biasing means at a plurality of positions along a path of travel of said follower element toward the second end of said primary chamber's cylindrical portion; and
    release means for releasing said locking means to allow said follower element to move toward the first end of said cylindrical portion under the biasing force of said biasing means, said release means extending generally transverse to the axis of said primary chamber's cylindrical portion and being actuatable from said viewing face of said housing.

2. A device in accordance with claim 1 wherein said indicator means includes an indicator needle pivotable about an axis generally transverse to the axis of said primary chamber's cylindrical portion, said indicator needle being disposed within said indicating portion of said primary chamber.

3. A device in accordance with claim 2 wherein said follower element includes a first arm extending from said follower element toward said viewing face, and wherein said indicator needle includes a coupling pin extending toward said first arm and contacting a portion of said first arm for transferring the linear reciprocal motion of said follower element to pivotal motion of said indicator needle.

4. A device in accordance with claim 3 wherein said first arm is comprised of an angled member having the first section extending generally perpendicularly from the axis of said primary chamber's cylindrical section toward said viewing face and a second section extending generally parallel to said axis, said second section having a slot formed therein for reception of said coupling pin.

5. A device in accordance with claim 4 wherein said follower element is comprised of a generally cup shaped member having a generally circular base and a cylindrical portion extending from said base in a direction toward the first end of said primary chambers's cylindrical portion, said first arm and a plurality of additional arms extending generally radially outward from said cylindrical portion, said housing including a plurality of pairs of ribs, each of said arms being received between one of said pairs of ribs to guide and follower element within said housing.

6. A device in accordance with claim 1 or 5 wherein said biasing means includes a coil spring having a first end in contact with the interior of said primary chamber's cylindrical portion adjacent its second end and a second end in contact with a portion of said follower element.

7. A device in accordance with claim 5 wherein the second section of said first arm is spaced radially from the cylindrical portion of said follower element, and wherein each of the additional arms has a first section extending generally perpendicularly and radially from the cylindrical portion and a second section extending from said first section in a direction generally parallel to the axis of said primary chamber's cylindrical portion and toward the second end thereof, said second section of each additional arm being spaced radially from the cylindrical portion of said follower element, a gap being formed between the second section of the first and additional arms and the cylindrical portion of said follower element, said biasing means including a coil spring having a first end in contact with the interior of said primary chamber's cylindrical portion adjacent its second end, and a second end received within said gap and in contact with said follower element.

8. A device in accordance with claim 1 or 2 wherein said locking means includes ratchet means comprised of mating ratchet teeth for allowing the motion of the follower element against the biasing force of said biasing means and for preventing the motion of said follower element under the biasing force of said biasing means.

9. A device in accordance with claim 3 wherein said locking means includes a plurality of first ratchet teeth extending from said first arm and a plurality of second ratchet teeth movably supported in said primary chamber, said second ratchet teeth being fixed in the axial direction of travel of said follower element and being movable into and out of engagement with said first ratchet teeth, second biasing means for biasing said second ratchet teeth into engagement with said first ratchet teeth, said first and second ratchet teeth permitting motion of said follower element in a direction against the biasing force of said biasing means and locking said follower element against motion in a direction with the biasing force of said biasing means.

10. A device in accordance with claim 9 wherein said release means includes a rod extending generally transverse to the axis of said primary chamber's cylindrical section and having a ramp section adjacent said second ratchet teeth, said rod being movable toward and away from said second ratchet teeth whereby said ramp section moves said second ratchet teeth out of engagement with said first ratchet teeth when said rod is moved toward said second ratchet teeth whereby said first biasing means is free to move said follower element.

11. A device in accordance with claim 4 wherein said locking means includes a plurality of first ratchet teeth extending from said second section of said first arm, a slide member having a plurality of second ratchet teeth for engagement with said first ratchet teeth, and second biasing means for biasing said second ratchet teeth into engagement with said first ratchet teeth, said first and second ratchet teeth in their engaged position permitting the motion of said follower element in an axial direction toward the second end of said primary chamber's cylindrical portion against the bias of said first biasing means and locking said follower element against motion toward the first end of said primary chamber's cylindrical portion under the biasing force of said first biasing means.

12. A device in accordance with claim 11 wherein said release means includes a rod having a first end disposed outside said viewing face and extending from said viewing face transversely of the axis of said primary chamber's cylindrical portion toward said slide member, said slide member having a first ramp section, said rod having a second ramp section for contacting said first ramp section to move said slide member and said second ratchet teeth out of contact with said first ratchet teeth whereby said follower element is free to move toward said first end of the primary chamber's cylindrical portion under the bias of said first biasing means.

13. A device in accordance with claim 3 wherein said indicator needle is fixedly secured to a rotatable rod, said rod having a first end disposed outside of said housing and a second end disposed within said primary chamber, said locking means including a plurality of first ratchet teeth extending from a member fixedly attached to the second end of said rod for rotary motion therewith and a plurality of second ratchet teeth fixedly secured in position within said primary chamber, said first and second ratchet teeth being engageable with one another whereby the linear reciprocal movement of said follower member is converted into pivoting motion of said indicator needle and rotary motion of said rod and said first ratchet teeth and whereby said first and second ratchet teeth in their engaged position allow the motion of said follower element against the bias of said first biasing means but not with the bias of said first biasing means.

14. A device in accordance with claim 13 including a transparent cover at the viewing face of said housing, a cap formed of a resilient material attached to a hole in said transparent cover, the first end of said rod being coupled to said cap and being biased thereby toward said transparent cover whereby said first and said ratchet teeth are biased into engagement with one another by said cap and are movable out of engagement by moving said rod inwardly against the bias of said cap.

15. A device in accordance with claim 1 including conduit means for coupling said first aperture means to a source of negative pressure.

16. A device in accordance with claim 1 or 15 including conduit means for connecting said second aperture means to a source of positive pressure.

17. A pressure sensitive indicating device comprising:
a housing defining a primary chamber, said primary chamber having a first end, a second end and an axis extending between said ends in a first direction;
a movable member supported in said primary chamber for motion therein, said movable member having a first side disposed in said primary chamber and a second side disposed outside said primary chamber;
first aperture means for providing fluid communication between said primary chamber and the exterior of said housing;
biasing means for biasing said movable member toward the first end of said primary chamber;
indicator means coupled to said movable member for movement therewith to indicate the position of said movable member within said primary chamber in response to fluid pressure applied to at least one of said sides of said movable member, said indicator means being visible from a viewing face of said housing, said viewing face being transverse to the primary chamber axis;
releasable locking means for locking said movable member and said indicator means against the biasing force of said biasing means at a plurality of positions along the path of travel of said movable member toward the second end of said primary chamber; and
release means for releasing said locking means to allow said movable member to move toward the first end of said primary chamber under the biasing force of said biasing means, said releasing means extending generally transverse to the axis of said primary chamber and being actuatable from said viewing face of said housing.

18. A device in accordance with claim 17 wherein said locking means includes mating ratchet teeth arranged to allow the motion of said movable member against the biasing force of said biasing means and to stop the motion of said movable member under the biasing force of said biasing means.

19. A device in accordance with claim 18 wherein said locking means includes a set of first ratchet teeth connected to said movable member and a set of second ratchet teeth supported in said primary housing and being movable into and out of engagement with said first ratchet teeth, and wherein said release means includes a rod extending from adjacent said second ratchet teeth toward said viewing face and being movable from said viewing face into engagement with said second ratchet teeth to move said second ratchet teeth out of mating engagement with said ratchet teeth to permit said movable member to be moved by the biasing force of said biasing means.

20. A device in accordance with claim 17, 18 or 19 wherein said indicator means includes an indicator needle pivotable about an axis generally perpendicular to the axis of said primary chamber.

21. A device in accordance with claim 20 wherein said movable member is comprised of a hollow bellows-type diaphragm having a first axial end secured to said housing adjacent to the first end of said primary chamber and a sealed second axial end received within said primary chamber for extending and retracting movements therein along the axis of said primary chamber, the hollow interior of said diaphragm forming a secondary chamber, and including second aperture means for providing fluid communication between said secondary chamber and the exterior of said housing.

22. A device in accordance with claim 21 wherein said biasing means is comprised of a calibrated coil spring supported within said primary chamber.

23. A device in accordance with claim 21 including a follower element in contact with the second axial end of said diaphragm, said follower element including a slot formed therein, said indicator means including a coupling pin extending from said indicator needle towards the follower element and being received within the slot of said follower element.

24. A device in accordance with claim 21 including a cap member attached to said housing adjacent the first end of said primary chamber, said cap member having conduit means for connecting said second aperture means with a source of positive pressure.

25. A restriction indicator for indicating the amount of contamination in an air filter media comprising:
a housing defining a primary chamber, said primary chamber having a first end, a second end and an axis extending between said ends in a first direction;
a movable member supported in said primary chamber for motion therein, said movable member having a first side disposed in said primary chamber and a second side disposed outside said primary chamber;
first aperture means for providing fluid communication between said primary chamber and the exterior of said housing;
means for connecting said first aperture means to a source of negative pressure in communication with an air filter media;
biasing means for biasing said movable member toward the first end of said primary chamber;
indicator means coupled to said movable member for movement therewith to indicate the position of said movable member within said primary chamber in response to fluid pressure applied to said first aperture means, said indicator means being visible from a viewing face of said housing, said viewing face being transverse to the primary chamber axis;
releasable locking means for locking said movable member and said indicator means against the biasing force of said biasing means at a plurality of positions along the path of travel of said movable member toward the second end of said primary chamber; and
release means for releasing said locking means to allow said movable member to move toward the first end of said primary chamber under the biasing force of said biasing means, said releasing means extending generally transverse to the axis of said primary chamber and being actuatable from said viewing face of said housing.

26. A restriction indicator for indicating the amount of contamination in an air filter media comprising:
- a housing defining a primary chamber having a generally cylindrical portion and an indicating portion extending therefrom, said cylindrical portion having a first end, a second end and an axis extending between said ends in a first direction;
- a hollow long travel bellows-type diaphragm having a first axial end secured to said housing adjacent said first end and a second axial end received within said cylindrical portion for extending and retracting movements therein along said axis;
- means for sealing said second axial end of said diaphragm to form a secondary chamber within the hollow interior of said diaphragm;
- first aperture means for providing fluid communication between said primary chamber and the exterior of said housing;
- second aperture means for providing fluid communication between said secondary chamber and the exterior of said housing;
- means for connecting said first aperture mean to a source of negative pressure in communication with an air filter media;
- a follower element supported in said cylindrical portion and coupled to said second axial end of said diaphragm for motion therewith, said follower element having a first arm extending generally radially from said axis, and said arm having a slot formed therein;
- biasing means supported in said primary chamber for biasing said follower element and said second axial end toward the first end of said cylindrical portion, said biasing means including a coil spring disposed in said cylindrical portion and having a first end adjacent the first end of said cylindrical portion and a second end in contact with said follower element;
- indicator means including a pivotable indicator needle and a coupling pin formed integral therewith, said coupling pin being coupled to the slot in the arm of said follower element for movement therewith to transfer the linear reciprocal movement of said follower element to pivotal the motion of said indicator needle to thereby indicate the position of said followr element within said primary chamber in response to fluid pressure applied to said first aperture means, said indicator needle being visible from a viewing face of said housing, said viewing face being transverse to the axis of said primary chamber's cylindrical portion;
- releasable locking means including mating ratchet teeth for locking said follower element and said indicator means against the biasing force of said biasing means at a plurality of positions along a path of travel of said follower element toward the second end of said primary chamber's cylindrical portion;
- release means including a rod extending generally transversely of said axis for releasing said locking means to allow said follower element to move toward the first end of said cylindrical portion under the biasing force of said biasing means, said rod including a ramp section for engaging a mating ramp section coupled to some of said mating ratchet teeth, said rod extending toward said viewing face and being actuatable therefrom to move said ramp sections into engagement.

* * * * *

UNITED STATES PATENT AND TRADEMARK OFFICE
CERTIFICATE OF CORRECTION

PATENT NO. : 4,184,376

DATED : January 22, 1980

INVENTOR(S) : Timothy J. Thomas et al.

It is certified that error appears in the above-identified patent and that said Letters Patent are hereby corrected as shown below:

Column 3, line 27, "a" should be deleted.

Column 8, lines 1-2, "atmostphere" should be --atmosphere--.

Column 9, line 15, "140" should be --149--.

Column 10, line 15, "extend" should be --extent--.

Column 16, line 11, "followr" should be --follower--.

Signed and Sealed this

Tenth Day of June 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,184,376    Page 1 of 2

DATED : January 22, 1980

INVENTOR(S) : Timothy J. Thomas; Harold A. Manguson

It is certified that error appears in the above-identified patent and that said Letters Patent are hereby corrected as shown below:

Abstract of the Disclosure

A pressure sensitive indicating device (10) is disclosed. The device (10) includes a housing (12) defining a primary chamber (26). The primary chamber (26) has a first end (28), a second end (30) and an axis (32) extending between the two ends. A movable member (34, 62) is supported in the primary chamber (26) for motion therein. The movable member has a first side disposed in the primary chamber (26) and a second side disposed outside the primary chamber (26). A first aperture mechanism (118) provides fluid communication between the primary chamber (26) and the exterior of the housing (12). A coil spring (84) biases the movable member toward the first end of the primary chamber. An indicator mechanism (86, 208) is coupled to the movable member for motion therewith to indicate the position of the movable member within the primary chamber in response to fluid pressure applied to at least one of the sides of the movable member. The indicator means is visible from a viewing face (14) of the housing. The viewing face is viewed transversely to the primary chamber axis (32). A releasable locking means (152, 226) locks the movable member and the indicator mechanism against the biasing force of the spring (84) at a plurality of positions along the path of travel of the movable member toward the second end of the primary chamber. A release mechanism (168, 220) is provided for releasing the locking mechanism to allow the movable member to move toward the first end of the primary chamber under the biasing force of the biasing means. The release mechanism extends generally transverse to the axis of the primary chamber and is actuatable from the viewing face of the housing.

UNITED STATES PATENT AND TRADEMARK OFFICE
CERTIFICATE OF CORRECTION

PATENT NO. : 4,184,376

DATED : January 22, 1980

INVENTOR(S) : Timothy J. Thomas et al

It is certified that error appears in the above-identified patent and that said Letters Patent are hereby corrected as shown below:

Column 2, line 7, delete "transverse" and insert --viewed transversely--.

Column 5, line 26, delete "disposed" and insert --viewed transversely--.

Column 10, claim 1, line 51, delete "transverse" and insert --viewed transversely--.

Column 13, claim 17, line 32, delete "transverse" and insert --viewed transversely--.

Column 14, claim 25, line 54, delete "transverse" and insert --viewed transversely--.

Column 16, claim 26, line 15, delete "transverse" and insert --viewed transversely--.

Signed and Sealed this

Twenty-eighth Day of October 1980

[SEAL]

Attest:

Attesting Officer

SIDNEY A. DIAMOND

Commissioner of Patents and Trademarks